(12) United States Patent
Liu et al.

(10) Patent No.: US 10,966,255 B2
(45) Date of Patent: Mar. 30, 2021

(54) RANDOM ACCESS METHOD, APPARATUS, SYSTEM, TERMINAL, AND BASE STATION

(71) Applicant: Huawei Technologies Co., Ltd., Guangdong (CN)

(72) Inventors: Kunpeng Liu, Beijing (CN); Xueru Li, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/370,430

(22) Filed: Mar. 29, 2019

(65) Prior Publication Data

US 2019/0230714 A1 Jul. 25, 2019

Related U.S. Application Data

(63) Continuation of application No. PCT/CN2017/103483, filed on Sep. 26, 2017.

(30) Foreign Application Priority Data

Sep. 30, 2016 (CN) .......................... 201610877255.5
Feb. 15, 2017 (CN) .......................... 201710082216.0

(51) Int. Cl.
*H04W 74/08* (2009.01)
*H04W 74/00* (2009.01)
(Continued)

(52) U.S. Cl.
CPC ..... *H04W 74/0833* (2013.01); *H04W 74/006* (2013.01); *H04W 76/19* (2018.02); *H04W 72/02* (2013.01);

(58) Field of Classification Search
CPC .......... H04W 74/0833; H04W 74/006; H04W 76/19; H04W 72/02; H04W 72/042; H04W 72/044
See application file for complete search history.

(56) References Cited

U.S. PATENT DOCUMENTS 10,149,325 B2 * 12/2018 Liu .................. H04W 74/0833
2011/0261752 A1 10/2011 Fischer et al.
(Continued)

FOREIGN PATENT DOCUMENTS

CN 101594678 A 12/2009
CN 102215475 A 10/2011
(Continued)

OTHER PUBLICATIONS

"Beamformed Random Access in NR," 3GPP TSG RAN WG1 Meeting #86, Gothenburg, Sweden, R1-166419, pp. 1-8, 3rd Generation Partnership Project, Valbonne, France (Aug. 22-26, 2016).

*Primary Examiner* — Min Jung
(74) *Attorney, Agent, or Firm* — Leydig, Voit & Mayer, Ltd.

(57) ABSTRACT

An access method, a terminal device, and a base station are provided. The method includes: determining, by a terminal device at a current moment, that a preset condition for a link exception is met, and determining that the current moment is within a preconfigured time window; selecting, by the terminal device, one access resource from at least two preconfigured access resources as a target access resource; and sending, by the terminal device, an access signal to the base station by using a time-frequency resource in the target access resource.

22 Claims, 5 Drawing Sheets

(51) Int. Cl.
*H04W 76/19* (2018.01)
*H04W 72/02* (2009.01)

(56) References Cited

U.S. PATENT DOCUMENTS

| | | | |
|---|---|---|---|
| 2013/0188473 A1 | 7/2013 | Dinan | |
| 2013/0265866 A1* | 10/2013 | Yi | H04W 74/0858 |
| | | | 370/216 |
| 2015/0009813 A1* | 1/2015 | Nguyen | H04W 4/70 |
| | | | 370/230 |
| 2016/0119887 A1* | 4/2016 | Charipadi | H04W 56/001 |
| | | | 370/335 |
| 2018/0070278 A1 | 3/2018 | Uemura et al. | |
| 2018/0077732 A1* | 3/2018 | Yi | H04W 74/0833 |
| 2018/0227887 A1* | 8/2018 | Hakola | H04B 7/0695 |
| 2019/0174551 A1* | 6/2019 | Liu | H04W 74/0833 |
| 2019/0387551 A1* | 12/2019 | Liu | H04L 5/0016 |

FOREIGN PATENT DOCUMENTS

| | | |
|---|---|---|
| KR | 20140019405 A | 2/2014 |
| WO | 2015008956 A1 | 1/2015 |
| WO | 2016048870 A1 | 3/2016 |
| WO | 2016153026 A1 | 9/2016 |

\* cited by examiner

RANDOM ACCESS METHOD, APPARATUS, SYSTEM, TERMINAL, AND BASE STATION

CROSS-REFERENCE TO RELATED APPLICATIONS

This application is a continuation of International Application No. PCT/CN2017/103483, filed on Sep. 26, 2017, which claims priorities to Chinese Patent Application No. 201610877255.5, filed on Sep. 30, 2016 and Chinese Patent Application No. 201710082216.0, filed on Feb. 15, 2017. The disclosures of the aforementioned applications are hereby incorporated by reference in their entireties.

TECHNICAL FIELD

The present invention relates to the communications field, and in particular, to an access method, a terminal device, and a base station.

BACKGROUND

In a wireless communications system, a terminal device needs to establish a connection to a network side device, and this procedure is generally referred to as a random access procedure. In a Long Term Evolution (LTE) system, after a radio link is interrupted, the terminal device needs to re-establish a connection through contention-based random access.

The contention-based random access includes the following four steps.

Step 1: Transmit a preamble sequence.

User equipment (UE) randomly selects one sequence from a higher layer parameter random access sequence set, and sends a random access preamble sequence (RACH Preamble) on a random access resource pre-specified by a base station.

Step 2: Random Access Response.

The UE receives, on a physical downlink shared channel (PDSCH), a random access response (RAR) delivered by the base station, and the UE determines, based on whether a response corresponding to the preamble sequence sent by the UE is received, whether random access succeeds.

Step 3: Send a Layer 2/Layer 3 Message.

The RAR received by the UE includes a temporary C-RNTI. The UE sends a random access procedure message to the base station on a physical uplink shared channel (PUSCH) specified in the RAR. The random access procedure message includes an identifier of the UE in a cell, and the identifier is used for contention resolution.

Step 4: Contention Resolution Message.

The UE receives a contention resolution message sent by the base station. If the contention resolution message includes the identifier of the UE, contention succeeds and a random access procedure is complete. If the contention resolution message does not include the identifier of the UE, contention fails and the UE needs to re-initiate random access.

It can be learned from the foregoing description that after the radio link is interrupted, a process in which the terminal device re-establishes a connection by using a contention-based random access procedure is relatively complex and requires a relatively long time.

SUMMARY

Embodiments of the present invention provide an access method, a terminal device, and a base station, so as to shorten an access delay.

According to a first aspect, an access method is provided, and the method includes:

determining, by a terminal device at a current moment, that a preset condition for a link exception is met, and determining that the current moment is within a preconfigured time window;

selecting, by the terminal device, one access resource from at least two preconfigured access resources as a target access resource, where the at least two access resources are valid for the terminal device in the time window, each of the at least two access resources includes a time-frequency resource and a sequence corresponding to the time-frequency resource, and Radio Resource Control RRC context information of the terminal device is stored in a base station in the time window; and sending, by the terminal device, an access signal to the base station by using a time-frequency resource in the target access resource, where the access signal is determined based on a sequence in the target access resource.

The access resource and the time window are preconfigured for the terminal device, and the base station stores the RRC context information of the terminal device in the time window. When a link exception occurs, the terminal device may send the access signal by using the access resource in the time window, and the base station can restore an RRC context of the terminal device based on the access signal and perform normal communication. The terminal device does not need to re-request an RRC resource, thereby shortening an access delay of the terminal device.

In a possible implementation, a time domain resource in the at least two access resources includes at least two time domain resources in the time window.

In a possible implementation, the preset condition for a link exception is that the terminal device detects uplink out-of-synchronization, downlink out-of-synchronization, or a radio link failure RLF, or the terminal device does not receive a response signal in a preset time period after sending a scheduling request, or the terminal device determines that energy of at least one pilot signal is lower than a first preset threshold.

In a possible implementation, the preset condition for a link exception is that energy of at least one first pilot signal is lower than a first preset threshold, and energy of at least one second pilot signal is higher than a second preset threshold, where the at least one first pilot signal is corresponding to at least one first beam used for data transmission, and the at least one second pilot signal is corresponding to at least one second beam other than the at least one first beam in a plurality of beams used for beam measurement;

the at least one first pilot signal is corresponding to at least one first beam used for channel measurement, and the at least one second pilot signal is corresponding to at least one second beam other than the at least one first beam in a plurality of beams used for beam measurement;

the at least one first pilot signal is corresponding to at least one first beam configured by the base station for the terminal device, and the at least one second pilot signal is corresponding to at least one second beam other than the at least one first beam in a plurality of beams configured by the base station for a cell in which the terminal device is located; or the at least one first pilot signal is corresponding to at least one first beam configured by the base station for the terminal device, and the at least one second pilot signal is corresponding to the at least one second beam configured by the base station for the terminal device.

In a possible implementation, the pilot signal is a beam measurement reference pilot signal or a demodulation pilot signal.

In a possible implementation, there is a correspondence between the at least two access resources and a sending beam and/or a receiving beam of the terminal device, or there is a correspondence between the at least two access resources and a sending beam and/or a receiving beam of the base station.

In a possible implementation, the access signal carries indication information, and the indication information is used to indicate a sending beam and/or a receiving beam that are/is of the terminal device and that are/is recommended by the terminal device; or the indication information is used to indicate a sending beam and/or a receiving beam that are/is of the base station and that are/is recommended by the terminal device.

Therefore, the base station can send and/or receive a signal by using the sending beam and/or the receiving beam that are/is of the terminal device and that are/is recommended by the terminal device or the sending beam and/or the receiving beam of the base station.

In a possible implementation, there is a correspondence between the at least two access resources and the sending beam and/or the receiving beam of the terminal device, and the indication information is indication information of an access resource corresponding to the sending beam and/or the receiving beam that are/is of the terminal device and that are/is recommended by the terminal device; or there is a correspondence between the at least two access resources and the sending beam and/or the receiving beam of the base station, and the indication information is indication information of an access resource corresponding to the sending beam and/or the receiving beam that are/is of the base station and that are/is recommended by the terminal device.

In a possible implementation, the method further includes:

receiving, by the terminal device, an access answer signal sent by the base station based on the access signal, where the access answer signal carries data scheduled by the base station.

In a possible implementation, the access signal carries information used to indicate the sending beam and/or the receiving beam that are/is of the base station and that are/is recommended by the terminal device, and the access answer signal further carries information used to indicate a sending beam and/or a receiving beam that are/is of the terminal device and that are/is recommended by the base station.

In a possible implementation, the access signal carries a beam measurement request, and the method further includes:

receiving, by the terminal device, an access answer signal sent by the base station based on the access signal, where the access answer signal carries configuration information of a reference signal used for beam measurement, and the configuration information is determined by the base station based on the beam measurement request.

In a possible implementation, the access answer signal further carries information used to indicate an uplink timing advance.

In a possible implementation, before the selecting, by the terminal device, one resource from at least two preconfigured resources as a target resource, the method further includes:

receiving, by the terminal device in an RRC connection state, resource configuration information sent by the base station, where the resource configuration information is used to indicate the at least two access resources and/or the time window.

In a possible implementation, the resource configuration information is carried in the following terminal device-specific signaling: dynamic signaling, RRC signaling, Medium Access Control MAC signaling, uplink scheduling signaling, downlink scheduling signaling, or signaling specially used to configure the access signal.

In a possible implementation, a set including time-frequency resources in the at least two access resources is a subset of a set including a time-frequency resource for contention-based random access, and a sequence in the at least two access resources is different from a sequence of the contention-based random access.

In a possible implementation, a length of each sequence in the at least two access resources is less than a length of the sequence of the contention-based random access.

In a possible implementation, a subcarrier spacing in the at least two access resources is greater than a subcarrier spacing of the contention-based random access.

In a possible implementation, the access signal is a random access signal, and the sequence is a preamble sequence.

A time-frequency resource in a time-frequency resource set of contention-based random access is used, so that no new time-frequency resource needs to be further configured, saving a time-frequency resource and improving utilization of a time-frequency resource.

In a possible implementation, a length of the time window is related to a quantity of link exception times.

Optionally, a larger quantity of link exception times indicates a greater length of the time window.

According to a second aspect, an access method is provided, and the method includes:

generating, by a base station, resource configuration information of a terminal device, where the resource configuration information is used to indicate at least two access resources and/or a time window, the at least two access resources are valid for the terminal device in the time window, each of the at least two access resources includes a time-frequency resource and a sequence corresponding to the time-frequency resource, and the base station stores Radio Resource Control RRC context information of the terminal device in the time window; and sending, by the base station, the resource configuration information to the terminal device when the terminal device is in an RRC connection state.

The access resource and the time window are preconfigured for the terminal device, and the base station stores the RRC context information of the terminal device in the time window. When a link exception occurs, the terminal device may send the access signal by using the access resource in the time window, and the base station can restore an RRC context of the terminal device based on the access signal and perform normal communication. The terminal device does not need to re-request an RRC resource, thereby shortening an access delay of the terminal device.

Optionally, the base station periodically or aperiodically sends the resource configuration information to the terminal device.

In a possible implementation, a time domain resource in the at least two access resources includes at least two time domain resources in the time window.

In a possible implementation, there is a correspondence between the at least two access resources and a sending beam and/or a receiving beam of the terminal device, or there is a correspondence between the at least two access resources and a sending beam and/or a receiving beam of the base station.

In a possible implementation, the method further includes:

detecting, by the base station in the time window by using the at least two access resources, an access signal sent by the terminal device.

In a possible implementation, the method further includes:

obtaining, by the base station, indication information based on the access signal, where the indication information is used to indicate a sending beam and/or a receiving beam that are/is of the terminal device and that are/is recommended by the terminal device; or the indication information is used to indicate a sending beam and/or a receiving beam that are/is of the base station and that are/is recommended by the terminal device.

In a possible implementation, there is a correspondence between the at least two access resources and the sending beam and/or the receiving beam of the terminal device, and the indication information is indication information of an access resource corresponding to the sending beam and/or the receiving beam that are/is of the terminal device and that are/is recommended by the terminal device; or there is a correspondence between the at least two access resources and the sending beam and/or the receiving beam of the base station, and the indication information is indication information of an access resource corresponding to the sending beam and/or the receiving beam that are/is of the base station and that are/is recommended by the terminal device.

In a possible implementation, the method further includes:

sending, by the base station, an access answer signal to the terminal device, where the access answer signal carries data scheduled by the base station.

In a possible implementation, the access signal carries information used to indicate the sending beam and/or the receiving beam that are/is of the base station and that are/is recommended by the terminal device, and the access answer signal further carries information used to indicate a sending beam and/or a receiving beam that are/is of the terminal device and that are/is recommended by the base station.

In a possible implementation, the method further includes:

obtaining, by the base station, a beam measurement request based on the access signal;

determining, by the base station based on the beam measurement request, configuration information of a reference signal used for beam measurement; and sending, by the base station, an access answer signal to the terminal device, where the access answer signal carries the configuration information.

In a possible implementation, the base station detects the access signal at a first moment, and sends the access answer signal to the terminal device at a second moment, where no data is transmitted between the base station and the terminal device at a time interval between the first moment and the second moment.

In a possible implementation, the access answer signal further carries information used to indicate an uplink timing advance.

In a possible implementation, the resource configuration information is carried in the following terminal device-specific signaling: dynamic signaling, RRC signaling, Medium Access Control MAC signaling, uplink scheduling signaling, downlink scheduling signaling, or signaling specially used to configure the access signal.

In a possible implementation, a set including time-frequency resources in the at least two access resources is a subset of a set including a time-frequency resource for contention-based random access, and a sequence in the at least two access resources is different from a sequence of the contention-based random access.

In a possible implementation, a length of each sequence in the at least two access resources is less than a length of the sequence of the contention-based random access.

In a possible implementation, a subcarrier spacing in the at least two access resources is greater than a subcarrier spacing of the contention-based random access.

In a possible implementation, the access signal is a random access signal, and the sequence is a preamble sequence.

In a possible implementation, a length of the time window is related to a quantity of link exception times.

Optionally, a larger quantity of link exception times indicates a greater length of the time window.

According to a third aspect, an embodiment of the present invention provides a communications apparatus. The apparatus has a function of implementing behavior of the terminal device in the foregoing method embodiment. The functions may be implemented by using hardware, or may be implemented by hardware by executing corresponding software. The hardware or the software includes one or more modules corresponding to the function.

In a possible design, the communications apparatus includes a processor and a transmitter. The processor is configured to select one access resource from at least two preconfigured access resources as a target access resource, and the transmitter is configured to send an access signal by using a time-frequency resource in the target access resource.

According to a fourth aspect, an embodiment of the present invention provides another communications apparatus. The apparatus has a function of implementing behavior of the base station in the foregoing method embodiment. The functions may be implemented by using hardware, or may be implemented by hardware by executing corresponding software. The hardware or the software includes one or more modules corresponding to the function.

In a possible design, the communications apparatus includes a processor and a transmitter. The processor is configured to generate resource configuration information, and the transmitter is configured to send the resource configuration information generated by the processor.

According to a fifth aspect, a computer readable storage medium is provided, the computer readable storage medium stores a program, and the program enables a terminal device to perform the method according to any one of the first aspect or possible implementations of the first aspect.

According to a sixth aspect, a computer readable storage medium is provided, the computer readable storage medium stores a program, and the program enables a base station to perform the method according to any one of the second aspect or possible implementations of the second aspect.

According to a seventh aspect, an embodiment of the present invention provides a communications system, and the system includes the base station and the terminal device in the foregoing aspects, or the system includes the base station and a network entity in the foregoing aspects, or the system includes the base station, the terminal device, and a network entity in the foregoing aspects.

The terminal device measures a reference signal in a pilot set, and determines that a preset condition for a link exception is met. The pilot set includes a first pilot signal set and a second pilot signal set. The first pilot signal set includes X0 first pilot signals, and the second pilot signal set includes Y0 second pilot signals, and X0 and Y0 are positive integers greater than 1. For example, X0=4, and Y0=2. X0 reference signals in a first pilot set are sent by using corresponding X0 beams, and Y0 reference signals in a second pilot set are sent by using corresponding Y0 beams.

The terminal device sends indication information, where the indication information includes identifiers of Y second pilot signals in the second pilot signal set, Y is a positive integer, and Y≤Y0.

Optionally, the preset condition for a link exception is as follows: X first pilot signals in the first pilot signal set meet a first condition, Y second pilot signals meet a second condition, X and Y are positive integers, and X<X0, Y≤Y0.

For example, the first condition may be as follows: The terminal device detects, by measuring X0 beams that send the X0 first pilot signals in the first pilot set, that receive power (received signaling receiving power, RSRP) or receiving quality (received signaling receiving quality, RSRQ) of pilot signals of X beams is lower than a predefined threshold. The second condition may be as follows: The terminal device detects, by measuring Y0 beams that send the Y0 second pilot signals in the second pilot set, that receive power RSRP or RSRQ of pilot signals of Y beams is lower than a predefined threshold. In this case, when considering that the preset condition for a link exception is met, the terminal device initiates a beam recovery procedure to the base station. Optionally, the terminal device sends indication information, where the indication information includes identifiers of Y second pilot signals in the second pilot signal set. Beams corresponding to the Y second pilot signals may replace the current X beams whose RSRP/RSRQ is lower than the threshold, and may be used by the base station to subsequently send a data channel or a control channel. The terminal device may further determine, based on another indicator of a beam of a pilot signal, whether is lower than the predefined threshold.

X is a positive integer less than X0, and a value of X is configurable. For example, before the terminal device measures the first pilot signal and/or the second pilot signal, the base station sends configuration information to configure the value of X. The configuration information may be carried in higher layer signaling, or carried in a Media Access Control control element (MAC CE), or carried in dynamic signaling (such as downlink control information, DCI). The value of X is configured through signaling instead of being predefined (for example, X=X0), to better adapt to a change of a channel environment. For example, when a channel between the terminal device and the base station mainly includes a line-of-sight path, communication between the base station and the terminal device mainly depends on one primary beam (main beam). In this case, a communication failure may occur on a control channel or a data channel provided that RSRP or RSRQ of the main beam is lower than the threshold (the control channel or the data channel is also sent on the main beam), and X=1 is required. When a channel between the terminal device and the base station mainly includes a multi-cluster path, communication between the base station and the terminal device may depend on a plurality of main beams. In this case, a communication failure may occur on a control channel or a data channel only when RSRPs or RSRQs of some beams are lower than the threshold. In this case, X>1 and X<X0 may be configured.

Optionally, the first pilot signal may include a channel measurement reference signal CSI-RS and a synchronization signal (SS). If the terminal device performs beam quality detection on the control channel to determine whether the preset condition for a link exception is met and determine whether to initiate beam recovery, the CSI-RS and the synchronization signal included in the first pilot signal are pilot signals that have a quasi co-location (QCL) association with a demodulation pilot reference signal DMRS of the control channel of the terminal device. For example, the base station sends a control channel of the terminal device by using a beam 1 and a beam 2, and sends a first pilot signal such as a CSI-RS by using the beam 1 and the beam 2. In this case, a CSI-RS of the beam 1 has a QCL association with a control channel sent on the beam 1, and a CSI-RS of the beam 2 has a QCL association with a control channel sent on the beam 2.

Optionally, the first pilot signal may be a DMRS of a control channel of the terminal device. The terminal device measures a plurality of beams (beams carrying a first pilot signal) that send a control channel and detect the control channel. When properly detecting the control channel, the terminal device determines, by reading DCI carried in the control channel, a second pilot signal that is configured by the base station for the terminal device and that needs to be measured or a beam that carries the second pilot signal.

Optionally, the control channel of the terminal device may be a control channel in user-specific search space. Optionally, the control channel of the terminal device may be a control channel in common search space.

Optionally, the first pilot signal may include a channel measurement reference signal CSI-RS and a synchronization signal. If the terminal device performs beam quality detection on the data channel to determine whether the preset condition for a link exception is met and determine whether to initiate beam recovery, the CSI-RS and the synchronization signal included in the first pilot signal are pilot signals that have a QCL association with a DMRS of the data channel of the terminal device. For example, the base station sends a data channel of the terminal device by using a beam 1, and sends a first pilot signal such as a CSI-RS by using the beam 1, so that a CSI-RS of the beam 1 has a QCL association with a data channel sent on the beam 1. In this case, the first pilot set used for measurement may be configured by the base station through signaling, for example, higher layer signaling, a MAC CE, or DCI.

Optionally, the first pilot signal may be a DMRS of the data channel of the terminal device. The terminal device first measures the control channel. After properly detecting the control channel, the terminal device obtains, based on the DCI, information such as a time-frequency resource location of the data channel, or information about a beam that sends data (the beam that carries the first pilot signal). In this case, the terminal device may measure the first pilot signal, and determine corresponding beam quality.

Optionally, the second pilot signal included in the second pilot set may be a CSI-RS, a synchronization signal, a DMRS of the data channel of the terminal device, or a DMRS of the control channel of the terminal device.

Optionally, the second pilot signal and the first pilot signal may be pilot signals of different types, for example, the first pilot signal is a CSI-RS, and the second pilot signal is a synchronization signal. Optionally, the second pilot signal and the first pilot signal may be pilot signals of a same type.

Optionally, the second pilot set is a set including a pilot signal in a universal pilot set configured by the base station for the terminal device except a pilot signal that has an association relationship with the first pilot signal set. For example, all pilots in the universal pilot set configured by the base station for the terminal device are CSI-RSs, and are respectively sent by using a beam 1, a beam 2, . . . , a beam 10 that are respectively corresponding to a CSI-RS 1 to a CSI-RS 10. If first pilots in the first pilot set are sent by using the beam 1 and the beam 2, second pilots in the second pilot set are the CSI-RS 3 to the CSI-RS 10, and are respectively sent by using the beam 3 to the beam 10. In other words, the second pilot set is a complementary set of the first pilot signal set. For another example, the pilots in the universal pilot set include the CSI-RS 1, the CSI-RS 2, the CSI-RS 3, and the CSI-RS 4, and further include an SS 1, an SS 2, an SS 3, and an SS 4. Only beams that send the CSI-RS 1 and the CSI-RS 2 have an association relationship with a beam that sends the SS 1. For example, the beam that sends the SS 1 is a relatively wide beam, and includes a relatively narrow beam that sends the CSI-RS 1 and a relatively narrow beam that sends the CSI-RS 2. In other words, a direction of the beam that sends the SS 1 is approximate to those of the beams that send the CSI-RS 1 and the CSI-RS 2. If the first pilot signal set includes the CSI-RS 1, the CSI-RS 2, the CSI-RS 3, and the CSI-RS 4, the second pilot set includes the SS 2, the SS 3, and the SS 4. The second pilot set is configured to be the set including the pilot signal in the universal pilot set configured by the base station for the terminal device except the pilot signal that has an association relationship with the first pilot signal set, so that when the beams corresponding to the first pilots are blocked, the beams corresponding to the second pilots are also blocked, resulting in reduction of quality of the beams. Monitoring efficiency of the terminal device is improved because there is no need to monitor a known blocked beam.

Optionally, the second pilot set is a set configured by the base station for the terminal device. Monitoring complexity of the terminal device may be reduced by properly configuring a size of the second pilot set. For example, in the foregoing example, when the universal pilot set configured by the base station for the terminal device is excessively large and the first pilot set is relatively small, directly using the method in the foregoing example causes the second pilot set to be excessively large. A size of the second pilot set can be reduced if the base station configures the second pilot set by using prior information, reducing unnecessary power consumption of the terminal device.

In conclusion, in the preset condition for a link exception that the X first pilot signals in the first pilot signal set meet the first condition, the Y second pilot signals meet the second condition, X and Y are positive integers, and X<X0, Y≤Y0, that the X first pilot signals meet the first condition may be as follows: RSRP or RSRQ of X CSI-RSs is lower than a first threshold, where the X CSI-RSs are CSI-RSs that have a QCL association with the DMRS of the control channel of the terminal device; or that the X first pilot signals meet the first condition may be as follows: RSRP or RSRQ of X SSs is lower than a first threshold, where the SSs are SSs that have a QCL association with the DMRS of the control channel of the terminal device; or that the X first pilot signals meet the first condition may be as follows: The terminal device properly detects the control channel, and RSRP or RSRQ of X DMRSs in DMRSs indicated by the DCI of the control channel is lower than a first threshold, where the DMRSs indicated by the DCI are DMRSs that are used by the terminal device for monitoring and that are indicated by the DCI in the properly detected control channel. For example, the base station sends the control channel by using four beams, and a DMRS of each control channel is the first pilot signal. The terminal device detects the control channel, and learns, by using the DCI, that DMRSs on the four beams need to be detected, and the terminal device discovers, through measurement, that RSRP or RSRQ of X DMRSs is lower than a first threshold.

Alternatively, that the X first pilot signals meet the first condition may be as follows: RSRP or RSRQ of X CSI-RSs is lower than a first threshold, where the X CSI-RSs are CSI-RSs that have a QCL association with the DMRS of the data channel of the terminal device.

Alternatively, that the X first pilot signals meet the first condition may be as follows: RSRP or RSRQ of X SSs is lower than a first threshold, where the X SSs are SSs that have a QCL association with the DMRS of the data channel of the terminal device.

Alternatively, that the X first pilot signals meet the first condition may be as follows: The terminal device properly detects the control channel, and RSRP/RSRQ of X DMRSs in DMRSs of the data channel is lower than a first threshold. For example, the base station sends the data channel by using the beam 1 and the beam 2. After properly detecting the control channel, the terminal device needs to demodulate a data channel on the beam 1 and the beam 2 and measure a DMRS on the two beams. The terminal device discovers, based on measurement, that RSRP/RSRQ of a DMRS of a data channel on one beam (X=1) is lower than a first threshold.

Optionally, which preset condition is selected from the foregoing possible preset conditions of a link exception may be configured by the base station by sending configuration information to the terminal device. The configuration information may be carried in higher layer signaling, a MAC CE, or DCI.

DESCRIPTION OF EMBODIMENTS

Figure 1:
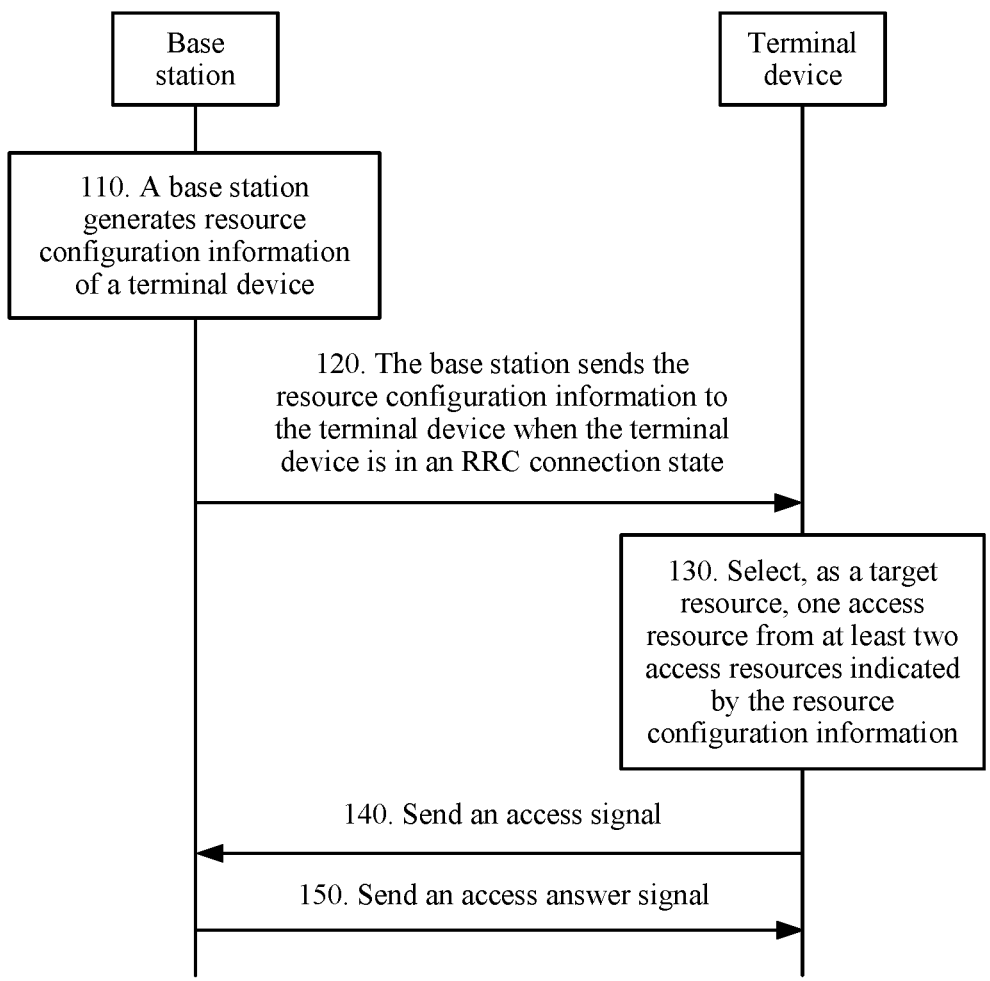
FIG. 1 is a schematic flowchart of an access method according to an embodiment of the present invention.

The following describes the technical solutions in the embodiments of the present invention with reference to the accompanying drawings in the embodiments of the present invention.

It should be understood that, the technical solutions of the present invention may be applied to various communications systems, for example, a Wireless Fidelity (WiFi) system, a Worldwide Interoperability for Microwave Access (WiMAX) system, a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, a Long Term Evolution Advanced (LTE-A) system, a Universal Mobile Telecommunications System (UMTS), and a cellular system related to the $3^{rd}$ Generation Partnership Project (3GPP). This is not limited in the embodiments of the present invention. However, for ease of description, an LTE network is used as an example in the embodiments of the present invention.

The embodiments of the present invention may be used in wireless networks of different standards. A radio access network may include different network elements in different systems. For example, network elements of a radio access network in Long Term Evolution (LTE) and LTE-A include an evolved NodeB (eNodeB, eNB), and network elements of a radio access network in Wideband Code Division Multiple Access (WCDMA) include a radio network controller (RNC) and a NodeB. Similarly, other wireless networks such as Worldwide Interoperability for Microwave Access (WiMAX) may also use solutions similar to those in the embodiments of the present invention, and the only difference is that the related modules in the base station system may be different. No limitation is set by the embodiments of the present invention. However, for ease of description, the following embodiments are described by using a base station as an example.

It should also be understood that in the embodiments of the present invention, the terminal device may also be referred to as user equipment (UE), a mobile station (MS), a mobile terminal, or the like. The terminal may communicate with one or more core networks by using a radio access network (RAN). For example, the terminal may be a mobile phone (or referred to as a "cellular" phone), or a computer having a communication function; for example, the terminal may also be a portable, pocket-sized, handheld, computer built-in, or in-vehicle mobile apparatus.

It should be understood that, the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, the terminal device may send and/or receive a signal by using an omnidirectional beam or a directional beam. Likewise, the base station may send and/or receive a signal by using the omnidirectional beam or the directional beam.

A sequence in the embodiments of the present invention may be used as a code domain resource.

FIG. 1 is a schematic flowchart of an access method 100 according to an embodiment of the present invention. As shown in FIG. 1, the method 100 includes the following content.

110. A base station generates resource configuration information of a terminal device, where the resource configuration information is used to indicate at least two access resources and/or a time window, the at least two access resources are valid for the terminal device in the time window, each of the at least two access resources includes a time-frequency resource and a sequence corresponding to the time-frequency resource, and the base station stores Radio Resource Control (Radio Resource Control, RRC) context information of the terminal device in the time window.

It should be noted that in some embodiments, the at least two access resources are valid for the terminal device only in the time window. Outside the time window, the at least two access resources may be invalid for the terminal device. For example, a sequence S1 is configured for the terminal device in the time window, and the sequence S1 may be configured for another terminal device outside the time window, and at this time, the sequence is invalid for the terminal device.

Optionally, a length of the time window may be predefined, or the length of the time window may be related to a quantity of link exception times. For example, a larger quantity of link exception times indicates a greater length of the time window.

120. The base station sends the resource configuration information to the terminal device when the terminal device is in an RRC connection state.

The base station may periodically or aperiodically send the resource configuration information to the terminal device.

It should be noted that after sending the resource configuration information to the terminal device, the base station detects, on the at least two access resources, whether a signal sent by the terminal device is received.

It should be noted that an example in which the base station configures at least two access resources and/or a time window for the terminal device is merely used for description in the embodiment shown in FIG. 1. However, this is not limited in this embodiment of the present invention. Alternatively, the at least two access resources and/or the time window may be preconfigured for the terminal device in a predefined manner or in another manner.

It should be further understood that the at least two access resources may be some or all of a plurality of access resources that are preconfigured in the terminal device, and the time window may be one of a plurality of time windows preconfigured in the terminal device. This is not limited in this embodiment of the present invention.

130. After the terminal device receives the resource configuration information, if the terminal device determines, at a current moment, that a preset condition for a link exception is met, and the current moment is within the time window indicated by the resource configuration information, the terminal device selects, as a target resource, one access resource from the at least two access resources indicated by the resource configuration information.

It should be noted that after obtaining the at least two access resources and/or the time window indicated by the resource configuration information, the terminal device may implicitly determine that the base station stores RRC context information of the terminal device in the time window.

For example, the base station may pre-agree with the terminal device on that the base station stores the RRC context information of the terminal device in the time window.

Optionally, a time domain resource in the at least two access resources includes at least two time domain resources in the time window. In other words, the at least two access resources are corresponding to at least two moments in the time window.

140. The terminal device sends an access signal to the base station by using a time-frequency resource in the target access resource, where the access signal is determined based on a sequence in the target access resource.

It should be understood that if the terminal device determines, at the current moment, that the preset condition for a link exception is met, and the current moment is not within the time window, the terminal device may perform access again in an existing contention-based random access manner.

In the prior art, RRC link re-setup and resource allocation need to be completed by using a contention-based random access procedure, wasting a resource and increasing an access delay. In this embodiment of the present invention, the RRC context information of the terminal device is stored in the base station in the time window. In this case, after a link exception occurs in the terminal device in the time window because a beam for communication is blocked, for example, normal communication fails due to a radio link failure, the base station can quickly identify a user by using an access signal, and the base station identifies, through detection of a preconfigured access signal, the user and restores an RRC context corresponding to the user, to perform normal communication.

Therefore, in this embodiment of the present invention, the access resource and the time window are preconfigured for the terminal device, and the base station stores the RRC context information of the terminal device in the time window. When a link exception occurs, the terminal device may send the access signal by using the access resource in the time window, and the base station can restore an RRC context of the terminal device based on the access signal and perform normal communication. The terminal device does not need to re-request an RRC resource, thereby shortening an access delay of the terminal device.

Optionally, in step 130, the terminal device selects, from the at least two access resources as the target access resource, an access resource corresponding to a next moment that has a shortest interval to the current moment, further shortening the access delay of the terminal device.

Figure 2:
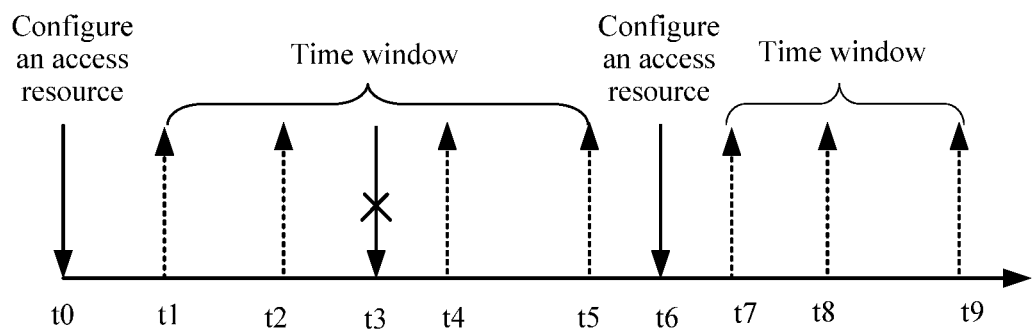
FIG. 2 is a schematic diagram of a principle according to an embodiment of the present invention.

As shown in FIG. 2, the base station configures at least two access resources and/or a time window for the terminal device in the RRC connection state at a moment t0. As shown in FIG. 2, a length of the time window ranges from a moment t1 to a moment t5. The moment t1, the moment t2, the moment t4, and the moment t5 in the time window each correspond to one access resource. If the terminal device discovers, at the moment t3, that the preset condition for a link exception is met, the terminal device uses an access resource corresponding to the moment t4 as the target access resource, and sends an access signal to the base station by using the target access resource. It should be noted that, in the embodiment shown in FIG. 2, the terminal device may alternatively use an access resource corresponding to the moment t5 as the target access resource. This is not limited in this embodiment of the present invention.

The base station may send the resource configuration information to the terminal device in the RRC connection state periodically or in a scheduled manner, to configure an access resource and/or a time window for the terminal device. As shown in FIG. 2, the base station may also resend the resource configuration information at a moment t6.

In some embodiments, the base station may configure time windows of different lengths for the terminal device at different moments. For example, the base station may flexibly determine a length of a time window based on a link status.

In some embodiments, a quantity of access resources configured by the base station for the terminal device at different moments in one time window may also vary. This can further improve scheduling flexibility of the base station.

Optionally, the preset condition for a link exception may be that the terminal device detects uplink out-of-synchronization, downlink out-of-synchronization, or a radio link failure (RLF), or the terminal device does not receive a response signal in a preset time period after sending a scheduling request, or the terminal device determines that energy of at least one pilot signal is lower than a first preset threshold.

Optionally, the preset condition for a link exception is that energy of at least one first pilot signal is lower than a first preset threshold, and energy of at least one second pilot signal is higher than a second preset threshold.

In some embodiments, the at least one first pilot signal is corresponding to at least one first beam used for data transmission, and the at least one second pilot signal is corresponding to at least one second beam in a plurality of beams used for beam measurement except the at least one first beam; or the at least one first pilot signal is corresponding to at least one first beam used for channel measurement, and the at least one second pilot signal is corresponding to at least one second beam in a plurality of beams used for beam measurement except the at least one first beam; or the at least one first pilot signal is corresponding to at least one first beam configured by the base station for the terminal device, and the at least one second pilot signal is corresponding to at least one second beam in a plurality of beams except the at least one first beam, where the plurality of beams are configured by the base station for a cell in which the terminal device is located; or the at least one first pilot signal is corresponding to at least one first beam configured by the base station for the terminal device, and the at least one second pilot signal is corresponding to at least one second beam configured by the base station for the terminal device.

Figure 3:
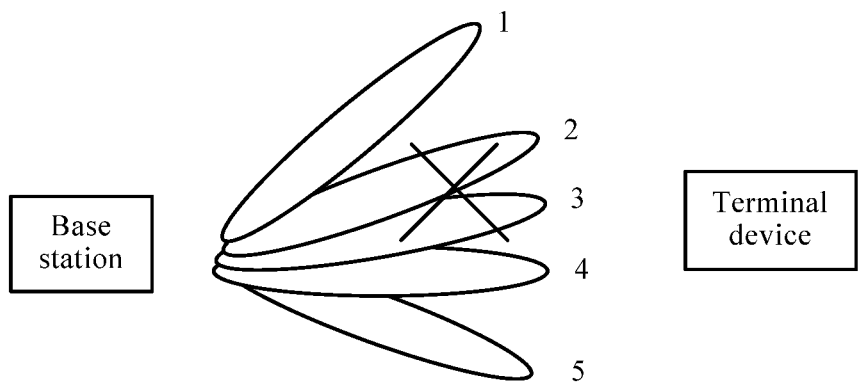
FIG. 3 is a schematic diagram of a scenario according to an embodiment of the present invention.

As shown in FIG. 3, when the terminal device sends and/or receives a signal by using a plurality of directional beams, if the terminal device discovers that energy of a pilot signal currently sent by using the beam 2 and the beam 3 is lower than a preset threshold, in other words, a link exception occurs in the beam 2 and the beam 3 (for example, the beam is blocked), normal communication cannot be performed. In addition, if the terminal device discovers that energy of a pilot signal sent by using the beam 1, the beam 4, and the beam 5 is higher than the preset threshold, in other words, it can be determined that links of the beam 1, the beam 4, and the beam 5 are normal, the terminal device may send an access signal to the base station by using the preconfigured access resource. Specifically, the terminal device may select, from the beam 1, the beam 4, and the beam 5, one beam (for example, a beam with best signal quality) to send an access signal for access. If the terminal device cannot determine a terminal beam with best signal quality, the terminal device may further separately send an access signal by using the beam 1, the beam 4, and the beam 5 for access.

It should be noted that the beam 2 and the beam 3 shown in FIG. 3 may be corresponding to the at least one first beam described above, and the beam 1, the beam 4, and the beam 5 may be corresponding to the at least one second beam described above.

In other words, in some embodiments, if the terminal device discovers that a link exception occurs in a currently used beam and links of other beams are normal, the terminal device may send an access signal on some or all of the other beams by using a preconfigured resource for access.

In some embodiments, after determining a beam used to send an access signal, the terminal device may further add indication information of the beam to the access signal. In some embodiments, the terminal device may further determine quality of a sending beam and/or a receiving beam of the base station. In this case, indication information of the sending beam and/or the receiving beam that are/is of the base station and that are/is recommended by the terminal device may be carried in the access signal to notify the base station.

Optionally, the access signal carries indication information, and the indication information is used to indicate a sending beam and/or a receiving beam that are/is of the terminal device and that are/is recommended by the terminal device, or the indication information is used to indicate a sending beam and/or a receiving beam that are/is of the base station and that are/is recommended by the terminal device. The sending beam and/or the receiving beam that are/is of the terminal device and that are/is recommended by the terminal device, or the sending beam and/or the receiving beam of the base station are beams with relatively high signal quality. In this case, the base station can send and/or receive a signal by using a beam recommended by the terminal device.

It should be understood that the terminal device may also add a beam with relatively poor signal quality to the access signal, to notify the base station of the beam with relatively poor signal quality. This is not limited in this embodiment of the present invention.

In some embodiments, the indication information may explicitly indicate the sending beam and/or the receiving beam that are/is of the terminal device and that are/is recommended by the terminal device; or the indication information may explicitly indicate the sending beam and/or the receiving beam that are/is of the base station and that are/is recommended by the terminal device. For example, the indication information may directly indicate an identifier of the sending beam and/or the receiving beam of the terminal device; or the indication information may directly indicate an identifier of the sending beam and/or the receiving beam of the base station.

In some embodiments, the indication information may further implicitly indicate the sending beam and/or the receiving beam of the terminal device; or the indication information may further implicitly indicate the sending beam and/or the receiving beam of the base station. For example, if there is a correspondence between an access resource (namely, a time-frequency resource and/or a sequence) and a sending beam and/or a receiving beam of the terminal device, the indication information may be indication information (such as an identifier of a time-frequency resource and/or a sequence) of the access resource (namely, the time-frequency resource and/or the sequence).

In this case, the base station may determine a corresponding sending beam and/or a corresponding receiving beam of the terminal device based on the indication information of the time-frequency resource and/or the sequence and the preconfigured correspondence. Similarly, if there is a correspondence between an access resource and a sending beam and/or a receiving beam of the base station, the indication information may also be indication information of the access resource.

In some embodiments, for example, one access resource is corresponding to a plurality of sending beams and/or a plurality of receiving beams of the terminal device; or a plurality of access resources are corresponding to one sending beam and/or one receiving beam of the terminal device; or an access resource is in a one-to-one correspondence with a sending beam and/or a receiving beam of the terminal device. The correspondence between an access resource and a sending beam and/or a receiving beam of the base station is similar, and details are not described herein.

Optionally, the pilot signal is a beam measurement reference pilot signal or a demodulation pilot signal.

In some embodiments, reciprocity exists between uplink transmission and downlink transmission, and there is a correspondence between a directional beam used by the base station and a directional beam used by the terminal device.

Figure 4A:
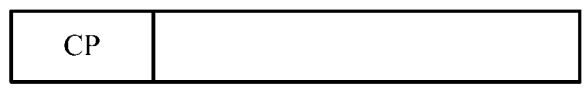
FIG. 4A is a schematic diagram of a format of a sequence in an access resource of a first type according to an embodiment of the present invention.
Figure 4B:
FIG. 4B is a schematic diagram of a format of a sequence in an access resource of a second type according to an embodiment of the present invention.

In some embodiments, two types of access resources may be separately configured for the base station and the terminal device: an access resource of a first type and an access resource of a second type. When the access resource of the first type is configured, the base station or the terminal device sends and/or receives a signal by using an omnidirectional beam, and when the access resource of the second type is configured, the base station or the terminal device sends and/or receives a signal by using the directional beam. Therefore, the base station and the terminal device can flexibly use a corresponding access resource as required. A format corresponding to the access resource of the first type is shown in FIG. 4A, and a corresponding sequence part is a long sequence. A format corresponding to the access resource of the second type is shown in FIG. 4B, and a corresponding sequence part is obtained by repeating one short sequence for a plurality of times. In this embodiment of the present invention, the at least two access resources preconfigured for the terminal device may include the access resource of the first type and/or the access resource of the second type.

Optionally, when sending and/or receiving a signal by using the directional beam, the terminal device may determine, based on reference signal receiving power (RSRP), which type of access resource is used for transmission.

When RSRP measured by the terminal device is higher than a specific threshold, in other words, the terminal device is located in a cell center, the terminal device may perform sending by using the omnidirectional beam. Although a beam gain of the omnidirectional beam is smaller than that of the directional beam, the omnidirectional beam may be used to meet a coverage requirement because the RSRP is higher than a specific threshold. Correspondingly, the terminal device may use the access resource of the first type, so that the base station can identify, based on the access resource used by the terminal device, that the terminal device performs sending by using the omnidirectional beam.

When the RSRP measured by the terminal device is lower than a specific threshold, in other words, the terminal device is located on a cell edge, the terminal device may perform sending by using the directional beam to meet a coverage requirement. In this case, the terminal device needs to traverse a plurality of beams to determine an appropriate directional beam for sending a signal. Correspondingly, the terminal device may use the access resource of the second type, so that the base station can identify, based on the access resource used by the terminal device, that the terminal device performs sending by using the directional beam.

Optionally, there may be a correspondence between an access resource of the second type and a directional beam. The terminal device may further determine, based on a beam used by a downlink signal sent by the base station, which access resource in access resources of the second type is used for transmission. The downlink signal may be a downlink synchronization signal, an RBCH, or a downlink pilot signal.

Figure 5:
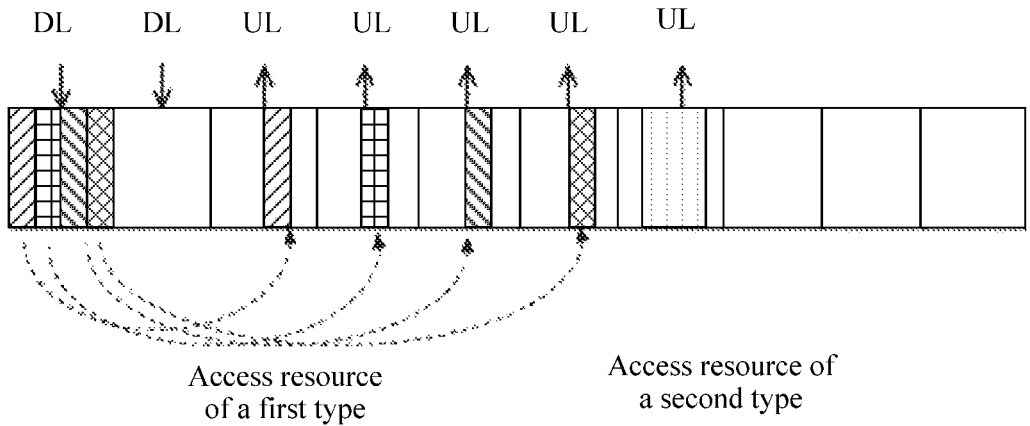
FIG. 5 is a schematic diagram of a correspondence between an access resource and a beam according to an embodiment of the present invention.

For example, as shown in FIG. 5, access resources of the first type preconfigured in the terminal device include four access resources, and each access resource is corresponding to a beam used by one downlink signal.

It should be noted that, as shown in FIG. 5, any downlink signal received by the terminal device using an omnidirectional beam is sent by the terminal device by using an access resource that is of the first type and that is corresponding to the omnidirectional beam.

Correspondingly, the base station may determine, as required, whether to use an access resource of a first type or an access resource of a second type to send the signal.

Optionally, the method 100 may further include:

150. After detecting the access signal sent by the terminal device, the base station sends an access answer signal to the terminal device.

In some embodiments, the terminal device sends the access signal at a first moment, the base station sends the access answer signal at a second moment, and no data is transmitted between the base station and the terminal device at a time interval between the first moment and the second moment. In other words, after detecting the access signal sent by the terminal device, the base station immediately sends the access answer signal to the terminal device, further shortening an access delay of the terminal device.

In some embodiments, the access answer signal carries data scheduled by the base station. The data scheduled by the base station may include data that is of the terminal device and that is buffered by the base station. In this case, the base station can normally communicate with the terminal device.

In some embodiments, the access signal carries information used to indicate the sending beam and/or the receiving beam that are/is of the base station and that are/is recommended by the terminal device, and the access answer signal carries the data scheduled by the base station and information used to indicate the sending beam and/or the receiving beam that are/is of the terminal device and that are/is recommended by the base station.

In this embodiment of the present invention, if the terminal device cannot determine a sending beam and/or a receiving beam that are/is of the terminal device and that have/has relatively good signal quality, the terminal device may send the access signal on a plurality of configured sending beams and/or a plurality of configured receiving beams of the terminal device. The base station may perform beam measurement on the plurality of sending beams and/or the plurality of receiving beams of the terminal device to determine a sending beam and/or a receiving beam that are/is of the terminal device and that have/has optimal signal quality, and notify the base station of the sending beam and/or the receiving beam of the terminal device.

In some embodiments, the access signal carries a beam measurement request, the access answer signal carries configuration information of a reference signal used for beam measurement, and the configuration information is determined by the base station based on the beam measurement request.

For example, referring to FIG. 3, the terminal device discovers that the currently used beam 2 and beam 3 are interrupted, and signal quality of another beam (such as the beam 1, the beam 4, and the beam 5) cannot be learned. In this case, the terminal device may add a beam measurement request to the access signal. After receiving the access signal, the base station sends the access answer signal to the terminal device, and adds, to the access answer signal, the configuration information of the reference signal used for beam measurement. After receiving the access answer information, the terminal device may perform beam measurement based on the configuration information carried in the access answer signal, and determine signal quality of another beam, to determine a new beam used for transmission.

Optionally, the access answer signal may further carry information used to indicate an uplink timing advance.

In some embodiments, the resource configuration information may be carried in the following terminal device-specific signaling: dynamic signaling, RRC signaling, media access control (MAC) signaling, uplink scheduling signaling, downlink scheduling signaling, or signaling specially used to configure the access signal.

The signaling specially used to configure the access signal may be specially configured for the access signal in this embodiment of the present invention.

Optionally, a set including time-frequency resources in the at least two access resources is a subset of a set including a time-frequency resource for contention-based random access, and a sequence in the at least two access resources is different from a sequence of the contention-based random access. A time-frequency resource in a time-frequency resource set of contention-based random access is used, so that no new time-frequency resource needs to be further configured, saving a time-frequency resource and improving utilization of a time-frequency resource.

Optionally, a length of each sequence in the at least two access resources is less than a length of a sequence of the contention-based random access, so that the sequence is differentiated from the sequence of the contention-based random access, reducing time domain resources occupied by the sequence, and improving resource utilization.

Optionally, a subcarrier spacing in the time-frequency resources in the at least two access resources is greater than a subcarrier spacing of the contention-based random access. This can reduce a time domain resource occupied when a plurality of beams are used for communication, and improve resource utilization.

In some embodiments, the access signal may be a random access signal, and the sequence may be a preamble sequence.

Figure 6:
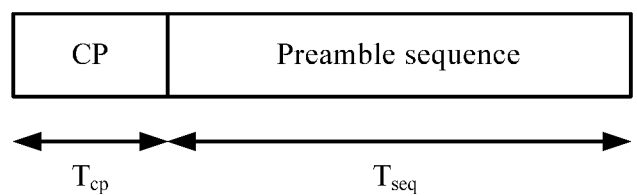
FIG. 6 is a schematic diagram of a format of a random access preamble sequence.

For example, a structure of the preamble sequence is shown in FIG. 6, and the preamble sequence includes a cyclic prefix (CP) whose length is $T_{cp}$ and a sequence whose length is $T_{sep}$. The preamble sequence has five formats shown in Table 1.

TABLE 1

| Preamble sequence format | $T_{cp}$ | $T_{seq}$ |
| --- | --- | --- |
| 0 | 3168 $T_s$ | 24576 $T_s$ |
| 1 | 21024 $T_s$ | 24576 $T_s$ |

TABLE 1-continued

| Preamble sequence format | $T_{cp}$ | $T_{seq}$ |
|---|---|---|
| 2 | 6240 $T_s$ | 2 24576 $T_s$ |
| 3 | 21024 $T_s$ | 2 24576 $T_s$ |
| 4 | 448 $T_s$ | 4096 $T_s$ |

For example, the preamble sequence set includes a root sequence and a cyclic shift sequence generated from the root sequence, and a calculation procedure is divided into two main steps:

(1) Generate a ZC (Zadoff-Chu) root sequence $x_u$ (n) as a reference sequence.

(2) Perform cyclic shift on the reference sequence $x_u$ (n) to generate 63 different cyclic sequences $x_{u, v}$ (n).

If less than 63 shift sequences are obtained based on the reference sequence in step (2), step (1) is performed again to generate a next reference sequence and a shift sequence corresponding to the new reference sequence, till 64 preamble sequences are met.

The reference sequence $x_u$ (n) may be calculated by using the following formula:

$$x_u(n) = e^{-j\frac{\pi u n(n+1)}{N_{ZC}}}, 0 \leq n \leq N_{ZC} - 1 \qquad (1)$$

The cyclic sequence $x_{u, v}$ (n) may be calculated by using the following formulas:

$$x_{u,v}(n) = x_u((n + C_v) \bmod N_{ZC}) \qquad (2)$$

$$C_v = \begin{cases} vN_{CS} & v = 0, 1, \ldots, \lfloor N_{ZC}/N_{CS} \rfloor - 1 \\ d_{start}\lfloor v/n_{shift}^{RA} \rfloor + (v \bmod n_{shift}^{RA})N_{CS} & v = 0, 1, \ldots, n_{shift}^{RA} n_{group}^{RA} + \bar{n}_{shift}^{RA} - 1 \end{cases} \qquad (3)$$

$N_{zc}$ is a length of a ZC sequence, u is a sequence indicator, n is a sequence index, $N_{cs}$ is a cyclic shift, and v is a notified index of the cyclic shift.

When the preamble sequence format is 0 to 3, $N_{zc}$ is always equal to 839; when the preamble sequence format is 4, $N_{zc}$ is always equal to 139.

It should be understood that for other parameters in the foregoing formulas (1) to (3), refer to related definitions in the prior art, and corresponding content is omitted herein.

It should be understood that the access signal in this embodiment of the present invention may also be an access signal of another type or format, and the sequence may also be a sequence of another type or format. This is not limited in this embodiment of the present invention.

Figure 7:
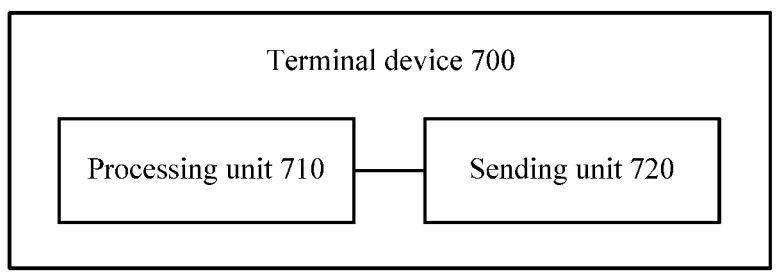
FIG. 7 is a schematic structural diagram of a terminal device according to an embodiment of the present invention.

FIG. 7 is a schematic structural diagram of a terminal device 700 according to an embodiment of the present invention. As shown in FIG. 7, the terminal device 700 includes a processing unit 710 and a sending unit 720.

The processing unit 710 is configured to determine, at a current moment, that a preset condition for a link exception is met, where the current moment is within a preconfigured time window.

The processing unit 710 is further configured to select one access resource from at least two preconfigured access resources as a target access resource, where the at least two access resources are valid for the terminal device in the time window, each of the at least two access resources includes a time-frequency resource and a sequence corresponding to the time-frequency resource, and Radio Resource Control RRC context information of the terminal device is stored in the base station in the time window.

The sending unit 720 is configured to send an access signal to the base station by using a time-frequency resource in the target access resource determined by the processing unit 710, where the access signal is determined based on a sequence in the target access resource.

Therefore, in this embodiment of the present invention, the access resource and the time window are preconfigured for the terminal device, and the base station stores the RRC context information of the terminal device in the time window. When a link exception occurs, the terminal device may send the access signal by using the access resource in the time window, and the base station can restore an RRC context of the terminal device based on the access signal and perform normal communication. The terminal device does not need to re-request an RRC resource, thereby shortening an access delay of the terminal device.

Optionally, a time domain resource in the at least two access resources includes at least two time domain resources in the time window.

Optionally, the preset condition for a link exception is that the terminal device detects uplink out-of-synchronization, downlink out-of-synchronization, or a radio link failure RLF, or the terminal device does not receive a response signal in a preset time period after sending a scheduling request, or the terminal device determines that energy of at least one pilot signal is lower than a first preset threshold.

Optionally, the preset condition for a link exception is that energy of at least one first pilot signal is lower than a first preset threshold, and energy of at least one second pilot signal is higher than a second preset threshold.

The at least one first pilot signal is corresponding to at least one first beam used for data transmission, and the at least one second pilot signal is corresponding to at least one second beam other than the at least one first beam in a plurality of beams used for beam measurement.

Alternatively, the at least one first pilot signal is corresponding to at least one first beam used for channel measurement, and the at least one second pilot signal is corresponding to at least one second beam other than the at least one first beam in a plurality of beams used for beam measurement.

Alternatively, the at least one first pilot signal is corresponding to at least one first beam configured by the base station for the terminal device, and the at least one second pilot signal is corresponding to at least one second beam other than the at least one first beam in a plurality of beams configured by the base station for a cell in which the terminal device is located.

Alternatively, the at least one first pilot signal is corresponding to at least one first beam configured by the base station for the terminal device, and the at least one second pilot signal is corresponding to the at least one second beam configured by the base station for the terminal device.

Optionally, the pilot signal is a beam measurement reference pilot signal or a demodulation pilot signal.

Optionally, there is a correspondence between the at least two access resources and a sending beam and/or a receiving beam of the terminal device.

Alternatively, there is a correspondence between the at least two access resources and a sending beam and/or a receiving beam of the base station.

Optionally, the access signal carries indication information, where the indication information is used to indicate a sending beam and/or a receiving beam that are/is of the terminal device and that are/is recommended by the terminal device; or the indication information is used to indicate a sending beam and/or a receiving beam that are/is of the base station and that are/is recommended by the terminal device.

Optionally, there is a correspondence between the at least two access resources and the sending beam and/or the receiving beam of the terminal device, and the indication information is indication information of an access resource corresponding to the sending beam and/or the receiving beam that are/is of the terminal device and that are/is recommended by the terminal device; or there is a correspondence between the at least two access resources and the sending beam and/or the receiving beam of the base station, and the indication information is indication information of an access resource corresponding to the sending beam and/or the receiving beam that are/is of the base station and that are/is recommended by the terminal device.

Figure 8:
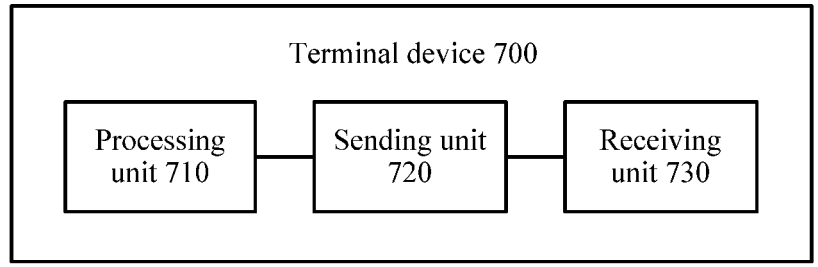
FIG. 8 is a schematic structural diagram of a terminal device according to another embodiment of the present invention.

Optionally, as shown in FIG. 8, the terminal device 700 may further include a receiving unit 730.

Optionally, the receiving unit 730 is configured to receive an access answer signal sent by the base station based on the access signal, where the access answer signal carries data scheduled by the base station.

Optionally, the access signal carries information used to indicate the sending beam and/or the receiving beam that are/is of the base station and that are/is recommended by the terminal device, and the access answer signal further carries information used to indicate the sending beam and/or the receiving beam that are/is of the terminal device and that are/is recommended by the base station.

Optionally, the access signal carries a beam measurement request. Correspondingly, the receiving unit 730 is configured to receive an access answer signal sent by the base station based on the access signal, where the access answer signal carries configuration information of a reference signal used for beam measurement, and the configuration information is determined by the base station based on the beam measurement request.

Optionally, the access answer signal further carries information used to indicate an uplink timing advance.

Optionally, the receiving unit 730 is configured to: when the terminal device is in an RRC connection state and before the processing unit determines the target resource, receive resource configuration information sent by the base station, where the resource configuration information is used to indicate the at least two access resources and/or the time window.

Optionally, the resource configuration information is carried in the following terminal device-specific signaling: dynamic signaling, RRC signaling, Medium Access Control MAC signaling, uplink scheduling signaling, downlink scheduling signaling, or signaling specially used to configure the access signal.

Optionally, a set including time-frequency resources in the at least two access resources is a subset of a set including a time-frequency resource for contention-based random access, and a sequence in the at least two access resources is different from a sequence of the contention-based random access.

Optionally, a length of each sequence in the at least two access resources is less than a length of a sequence of the contention-based random access.

Optionally, a subcarrier spacing in the at least two access resources is greater than a subcarrier spacing of the contention-based random access.

Optionally, the access signal is a random access signal, and the sequence is a preamble sequence.

Optionally, a length of the time window is related to a quantity of link exception times.

It should be understood that the terminal device 700 according to this embodiment of the present invention may be corresponding to the terminal device in the access method 100 according to the embodiment of the present invention, and the foregoing and other operations and/or functions of units in the terminal device 700 are respectively intended to implement corresponding procedures of the method 100 shown in FIG. 1. For brevity, details are not described herein.

Figure 9:
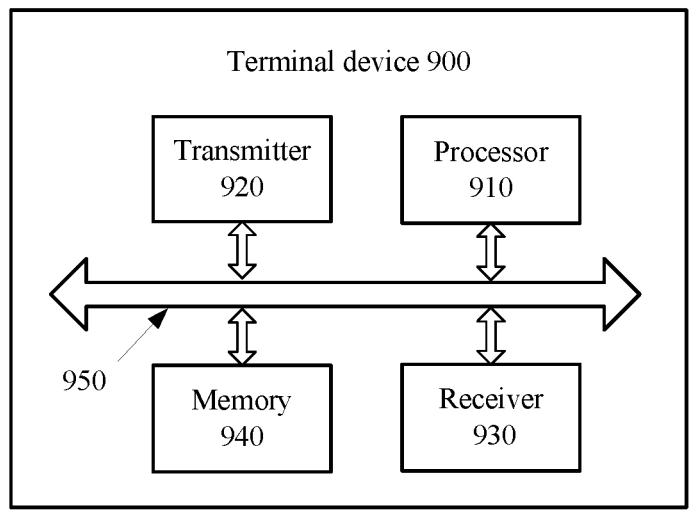
FIG. 9 is a schematic structural diagram of a terminal device according to another embodiment of the present invention.

It should be noted that the processing unit 710 may be implemented by a processor, the sending unit 720 may be implemented by a transmitter, and the receiving unit 730 may be implemented by a receiver. FIG. 9 is a schematic structural diagram of a terminal device 900 according to another embodiment of the present invention. As shown in FIG. 9, the terminal device 900 includes a processor 910, a transmitter 920, a receiver 930, a memory 940, and a bus system 950. All components of the terminal device 900 are coupled together by using the bus system 950.

The memory 940 may be configured to store code or the like executed by the processor 910. The transmitter 920 is configured to send a signal under control of the processor 910. The receiver 930 is configured to receive a signal under control of the processor 910.

Specifically, the processor 910 is configured to implement a function of the processing unit 710, the transmitter 920 is configured to implement a function of the sending unit 720, and the receiver 930 is configured to implement a function of the receiving unit 730.

It should be understood that the terminal device 900 according to this embodiment of the present invention may be corresponding to the terminal device in the access method 100 according to the embodiment of the present invention and the terminal device 700 according to the embodiment of the present invention. In addition, the foregoing and other operations and/or functions of units in the terminal device 900 are respectively intended to implement corresponding procedures of the method 100 shown in FIG. 1. For brevity, details are not described herein.

Figure 10:
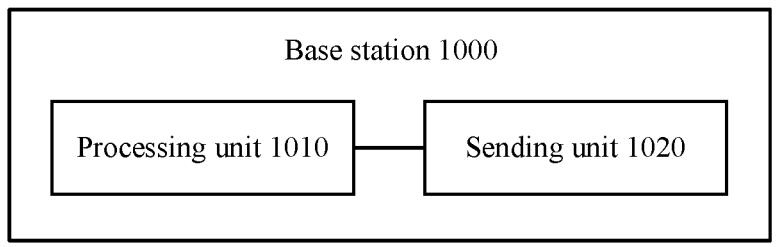
FIG. 10 is a schematic structural diagram of a base station according to an embodiment of the present invention.

FIG. 10 is a schematic structural diagram of a base station 1000 according to another embodiment of the present invention. As shown in FIG. 10, the base station 1000 includes a processing unit 1010 and a sending unit 1020.

The processing unit 1010 is configured to generate resource configuration information of a terminal device, where the resource configuration information is used to indicate at least two access resources and/or a time window, the at least two access resources are valid for the terminal device in the time window, each of the at least two access resources includes a time-frequency resource and a sequence corresponding to the time-frequency resource, and the base station stores RRC context information of the terminal device in the time window.

The sending unit 1020 is configured to send, to the terminal device when the terminal device is in an RRC connection state, the resource configuration information generated by the processing unit 1010.

Therefore, in this embodiment of the present invention, the access resource and the time window are preconfigured for the terminal device, and the base station stores the RRC context information of the terminal device in the time window. When a link exception occurs, the terminal device may send the access signal by using the access resource in the time window, and the base station can restore an RRC context of the terminal device based on the access signal and perform normal communication. The terminal device does not need to re-request an RRC resource, thereby shortening an access delay of the terminal device.

Optionally, a time domain resource in the at least two access resources includes at least two time domain resources in the time window.

Optionally, there is a correspondence between the at least two access resources and a sending beam and/or a receiving beam of the terminal device. Alternatively, there is a correspondence between the at least two access resources and a sending beam and/or a receiving beam of the base station.

Optionally, the processing unit 1010 is further configured to detect, by using the at least two access resources in the time window, the access signal sent by the terminal device.

Optionally, the processing unit 1010 is further configured to obtain indication information based on the access signal, where the indication information is used to indicate a sending beam and/or a receiving beam that are/is of the terminal device and that are/is recommended by the terminal device. Alternatively, the indication information is used to indicate a sending beam and/or a receiving beam that are/is of the base station and that are/is recommended by the terminal device.

Optionally, there is a correspondence between the at least two access resources and the sending beam and/or the receiving beam of the terminal device, and the indication information is indication information of an access resource corresponding to the sending beam and/or the receiving beam that are/is of the terminal device and that are/is recommended by the terminal device. Alternatively, there is a correspondence between the at least two access resources and the sending beam and/or the receiving beam of the base station, and the indication information is indication information of an access resource corresponding to the sending beam and/or the receiving beam that are/is of the base station and that are/is recommended by the terminal device.

Optionally, the sending unit 1020 is further configured to send an access answer signal to the terminal device, where the access answer signal carries data scheduled by the base station.

Optionally, the access signal carries information used to indicate the sending beam and/or the receiving beam that are/is of the base station and that are/is recommended by the terminal device, and the access answer signal further carries information used to indicate the sending beam and/or the receiving beam that are/is of the terminal device and that are/is recommended by the base station.

Optionally, the processing unit 1010 is further configured to: obtain a beam measurement request based on the access signal, and determine, based on the beam measurement request, configuration information of a reference signal used for beam measurement. The sending unit 1020 is further configured to send an access answer signal to the terminal device, where the access answer signal carries the configuration information.

Optionally, the processing unit 1010 detects the access signal at a first moment, the sending unit 1020 sends the access answer signal to the terminal device at a second moment, and no data is transmitted between the base station and the terminal device at a time interval between the first moment and the second moment.

Optionally, the access answer signal further carries information used to indicate an uplink timing advance.

Optionally, the resource configuration information is carried in the following terminal device-specific signaling: dynamic signaling, RRC signaling, Medium Access Control MAC signaling, uplink scheduling signaling, downlink scheduling signaling, or signaling specially used to configure the access signal.

Optionally, a set including time-frequency resources in the at least two access resources is a subset of a set including a time-frequency resource for contention-based random access, and a sequence in the at least two access resources is different from a sequence of the contention-based random access.

Optionally, a length of each sequence in the at least two access resources is less than a length of a sequence of the contention-based random access.

Optionally, a subcarrier spacing in the at least two access resources is greater than a subcarrier spacing of the contention-based random access.

Optionally, the access signal is a random access signal, and the sequence is a preamble sequence.

Optionally, a length of the time window is related to a quantity of link exception times.

It should be understood that the base station 1000 according to this embodiment of the present invention may be corresponding to the base station in the access method 100 according to the embodiment of the present invention. In addition, the foregoing and other operations and/or functions of units in the base station 1000 are respectively intended to implement corresponding procedures of the method 100 shown in FIG. 1. For brevity, details are not described herein again.

Figure 11:
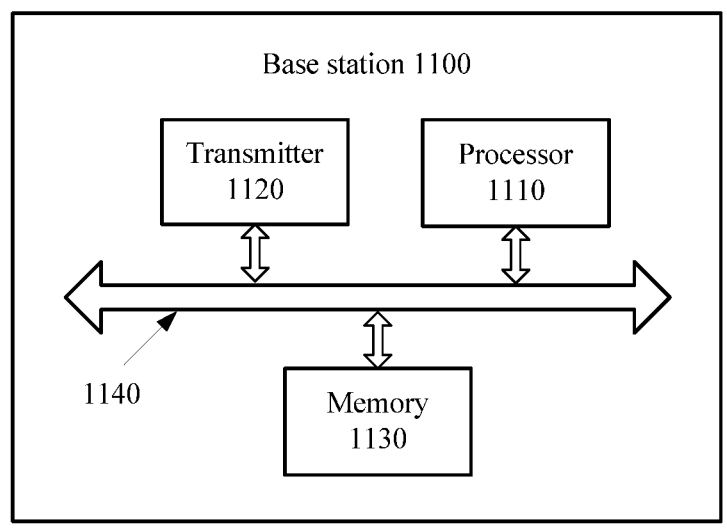
FIG. 11 is a schematic structural diagram of a base station according to another embodiment of the present invention.

It should be noted that the processing unit 1010 may be implemented by a processor, and the sending unit 1020 may be implemented by a transmitter. FIG. 11 is a schematic structural diagram of a base station 1100 according to another embodiment of the present invention. As shown in FIG. 11, the base station 1100 includes a processor 1110, a transmitter 1120, a memory 1130, and a bus system 1140. All components of the base station 1100 are coupled together by using the bus system 1140.

The memory 1130 may be configured to store code or the like executed by the processor 1110. The transmitter 1120 is configured to send a signal under control of the processor 1110.

Specifically, the processor 1110 is configured to implement a function of the processing unit 910, and the transmitter 1120 is configured to implement a function of the sending unit 920.

Optionally, the base station 1100 may further include a receiver, and the receiver may be configured to receive a signal under control of the processor 1110.

It should be understood that the base station 1100 according to this embodiment of the present invention may be corresponding to the base station in the access method 100 according to the embodiment of the present invention and the base station 900 according to the embodiment of the present invention. In addition, the foregoing and other operations and/or functions of units in the base station 1100 are respectively intended to implement corresponding procedures of the method 100 shown in FIG. 1. For brevity, details are not described herein again.

It should be noted that the bus system in the foregoing embodiments may further include a power bus, a control bus, a status signal bus, and the like, in addition to a data bus. For ease of representation, various buses are marked as the bus system in the figure.

The memory in the foregoing embodiments may include a volatile memory, such as a random-access memory (RAM); the memory may include a nonvolatile memory, such as a flash memory, a hard disk drive (HDD), or a solid-state drive (SSD); or the memory may include a combination of the foregoing types of memories.

The processor in the foregoing embodiments may be a central processing unit (CPU), a network processor (NP), or a combination of a CPU and an NP. The processor 710 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An access method comprising:
   determining, by a terminal device at a current moment, that a preset condition for a link exception is met, and determining that the current moment is within a time window;
   selecting, by the terminal device and based on received signaling receiving power (RSRP) or received signaling receiving quality (RSRQ), one access resource from at least two access resources as a target access resource,
      wherein the at least two access resources are valid for the terminal device in the time window,
      wherein each of the at least two access resources comprises a time-frequency resource and a preamble sequence associated with the time-frequency resource, and
      wherein radio resource control (RRC) context information of the terminal device is stored in a base station within the time window; and
   sending, by the terminal device in a RRC connection state, an access signal to the base station by using the time-frequency resource of the target access resource, wherein the access signal is determined based on a preamble sequence in the target access resource.

2. The method according to claim 1, wherein the time-frequency resource of the at least two access resources comprises at least two time domain resources in the time window.

3. The method according to claim 1, wherein the preset condition for the link exception is the terminal device determining that energy of at least one pilot signal is lower than a preset threshold.

4. The method according to claim 3, wherein the at least one pilot signal is a beam measurement reference pilot signal.

5. The method according to claim 1, wherein the preset condition for the link exception is that energy of at least one first pilot signal is lower than a first preset threshold, and energy of at least one second pilot signal is higher than a second preset threshold, wherein the at least one first pilot signal is associated with at least one first beam configured by the base station for the terminal device, and the at least one second pilot signal is associated with at least one second beam configured by the base station for the terminal device.

6. The method according to claim 1, wherein there is a relationship between (i) the at least two access resources and (ii) at least a sending beam of the base station.

7. The method according to claim 1, wherein the access signal carries indication information for indicating a sending beam and a receiving beam that are of the base station and recommended by the terminal device.

8. The method according to claim 1, wherein before selecting the access resource from the at least two access resources as the target access resource, the method further comprises:
   receiving, by the terminal device in a RRC connection state, resource configuration information sent by the base station, wherein the resource configuration information indicates (a) the at least two access resources and/or (b) the time window.

9. The method according to claim 1, wherein a set consisting of time-frequency resources in the at least two access resources is a subset of a set consisting of a time-frequency resource for contention-based random access, and a sequence in the at least two access resources is different from a sequence of the contention-based random access.

10. The method according to claim 1, wherein the access signal is a random access signal.

11. A terminal device comprising:
   a processor and a memory storing code for execution by the processor such that, when the code is executed by the processor, the processor is configured to:
      determine, at a current moment, that a preset condition for a link exception is met, and determine that the current moment is within a time window,
      select one access resource from at least two access resources as a target access resource, wherein the selection is based on received signaling receiving power (RSRP) or received signaling receiving quality (RSRQ),
         wherein the at least two access resources are valid for the terminal device in the time window,
         wherein each of the at least two access resources comprises a time-frequency resource and a preamble sequence associated with the time-frequency resource, and
         wherein radio resource control (RRC) context information of the terminal device is stored in a base station in the time window; and
   a transmitter configured to cooperate with the processor to send an access signal to the base station in a RRC connection state by using the time-frequency resource of the target access resource determined by the processor,
      wherein the access signal is determined based on a preamble sequence in the target access resource.

12. The terminal device according to claim 11, wherein the time-frequency resource of the at least two access resources comprises at least two time domain resources in the preconfigured time window.

13. The terminal device according to claim 11, wherein the preset condition for the link exception is the terminal device determining that energy of at least one pilot signal is lower than a first threshold.

14. The terminal device according to claim 13, wherein the at least one pilot signal is a beam measurement reference pilot signal.

15. The terminal device according to claim 11, wherein the preset condition for the link exception is that energy of at least one first pilot signal is lower than a first preset threshold, and energy of at least one second pilot signal is higher than a second preset threshold, wherein the at least one first pilot signal is associated with at least one first beam configured by the base station for the terminal device, and the at least one second pilot signal is associated with at least one second beam configured by the base station for the terminal device.

16. The terminal device according to claim 11, wherein there is a relationship between (i) the at least two access resources and (ii) at least a sending beam of the base station.

17. The terminal device according to claim 11, wherein the access signal carries indication information indicating a sending beam and a receiving beam that are of the base station and recommended by the terminal device.

18. The terminal device according to claim 11, further comprising a receiver configured to:
   when the terminal device is in an RRC connection state and before the processor determines the target access resource, cooperate with the processor to receive resource configuration information sent by the base station,
      wherein the resource configuration information indicates (a) the at least two access resources and/or (b) the time window.

19. The terminal device according to claim 11, wherein a set consisting of time-frequency resources in the at least two access resources is a subset of a set consisting of a time-frequency resource for contention-based random access, and a sequence in the at least two access resources is different from a sequence of the contention-based random access.

20. The terminal device according to claim 11, wherein the access signal is a random access signal.

21. A non-transitory computer readable medium storing instructions that, when executed by one or more processors, cause the one or more processors to be configured to provide at least the following operations:
   determining, at a current moment, that a preset condition for a link exception is met, and determining that the current moment is within a time window;
   selecting, based on received signaling receiving power (RSRP) or received signaling receiving quality (RSRQ), one access resource from at least two access resources as a target access resource,
      wherein the at least two access resources are valid in the time window,
      wherein each of the at least two access resources comprises a time-frequency resource and a preamble sequence associated with the time-frequency resource, and
      wherein radio resource control (RRC) context information of a terminal device is stored in a base station within the time window; and
   sending, in a RRC connection state, an access signal to a base station by using the time-frequency resource of the target access resource,
      wherein the access signal is determined based on a preamble sequence in the target access resource.

22. The non-transitory computer readable medium according to claim 21, wherein the time-frequency resource of the at least two access resources comprises at least two time domain resources in the time window.

* * * * *